United States Patent
Kwon et al.

(10) Patent No.: US 10,830,891 B2
(45) Date of Patent: Nov. 10, 2020

(54) NIGHT IMAGE DISPLAY APPARATUS AND IMAGE PROCESSING METHOD THEREOF

(71) Applicant: LG ELECTRONICS INC., Seoul (KR)

(72) Inventors: Youngman Kwon, Seoul (KR); Kwanhyung Kim, Seoul (KR); Salkmann Ji, Seoul (KR); Joseph Yoon, Seoul (KR); Taegil Cho, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 16/065,764

(22) PCT Filed: Feb. 5, 2016

(86) PCT No.: PCT/KR2016/001346
§ 371 (c)(1),
(2) Date: Jun. 22, 2018

(87) PCT Pub. No.: WO2017/111201
PCT Pub. Date: Jun. 29, 2017

(65) Prior Publication Data
US 2019/0011564 A1    Jan. 10, 2019

(30) Foreign Application Priority Data
Dec. 24, 2015  (KR) .................. 10-2015-0186740

(51) Int. Cl.
*G01S 17/89*  (2020.01)
*B60W 40/02*  (2006.01)
(Continued)

(52) U.S. Cl.
CPC .............. *G01S 17/89* (2013.01); *B60K 35/00* (2013.01); *B60R 1/00* (2013.01); *B60W 40/02* (2013.01);
(Continued)

(58) Field of Classification Search
None
See application file for complete search history.

(56) References Cited

U.S. PATENT DOCUMENTS

2003/0155513 A1   8/2003   Remillard et al.
2003/0230705 A1  12/2003   Stephan et al.
(Continued)

FOREIGN PATENT DOCUMENTS

CN    102685516    9/2012
CN    104442571    3/2015
(Continued)

OTHER PUBLICATIONS

PCT International Application No. PCT/KR2016/001346, International Search Report dated Aug. 31, 2016, 4 pages.
(Continued)

*Primary Examiner* — Heather R Jones
(74) *Attorney, Agent, or Firm* — Lee, Hong, Degerman, Kang & Waimey

(57) ABSTRACT

The present invention relates to a night image output apparatus, comprising: a photographing unit comprising an optical pulse output unit for outputting optical pulses and an image sensor for forming a plurality of images using optical pulses reflected by an external object; a display unit for outputting a final image made by synthesizing the plurality of images; and a control unit for calculating object distance information displayed in each pixel of the final image, by
(Continued)

using data of a light quantity ratio of the plurality of images to each pixel of the final image and a light quantity ratio related to distance.

15 Claims, 12 Drawing Sheets

(51) Int. Cl.

| | |
|---|---|
| *B60W 50/14* | (2020.01) |
| *G01S 7/481* | (2006.01) |
| *G01S 7/51* | (2006.01) |
| *B60K 35/00* | (2006.01) |
| *G01S 7/486* | (2020.01) |
| *G01S 17/46* | (2006.01) |
| *G01S 17/18* | (2020.01) |
| *B60R 1/00* | (2006.01) |
| *G01S 7/484* | (2006.01) |
| *G01S 13/86* | (2006.01) |
| *G01S 17/42* | (2006.01) |
| *G06K 9/00* | (2006.01) |
| *H04N 5/30* | (2006.01) |

(52) U.S. Cl.
CPC ............ *B60W 50/14* (2013.01); *G01S 7/484* (2013.01); *G01S 7/486* (2013.01); *G01S 7/4815* (2013.01); *G01S 7/51* (2013.01); *G01S 13/865* (2013.01); *G01S 17/18* (2020.01); *G01S 17/42* (2013.01); *G01S 17/46* (2013.01); *G06K 9/00805* (2013.01); *H04N 5/30* (2013.01); *B60K 2370/1529* (2019.05); *B60K 2370/176* (2019.05); *B60K 2370/179* (2019.05); *B60R 2300/106* (2013.01); *B60R 2300/307* (2013.01)

(56) References Cited

U.S. PATENT DOCUMENTS

| | | |
|---|---|---|
| 2011/0194099 A1 | 8/2011 | Kamiyama |
| 2012/0086781 A1 | 4/2012 | Iddan et al. |
| 2017/0234976 A1* | 8/2017 | Grauer ................. G01S 17/107 356/5.04 |

FOREIGN PATENT DOCUMENTS

| | | |
|---|---|---|
| EP | 2322953 | 5/2011 |
| JP | 2015144327 | 8/2015 |
| KR | 1020140104857 | 8/2014 |
| KR | 1020150134920 | 12/2015 |

OTHER PUBLICATIONS

European Patent Office Application Serial No. 16879069.9, Search Report dated Jun. 25, 2019, 8 pages.
State Intellectual Property Office of the People's Republic of China Application Serial No. 201680075684.9, Office Action dated Aug. 24, 2020, 12 pages.

* cited by examiner

FIRST TIME INTERVAL

DISTANCE-BASED LIGHT QUANTITY(1pulse)

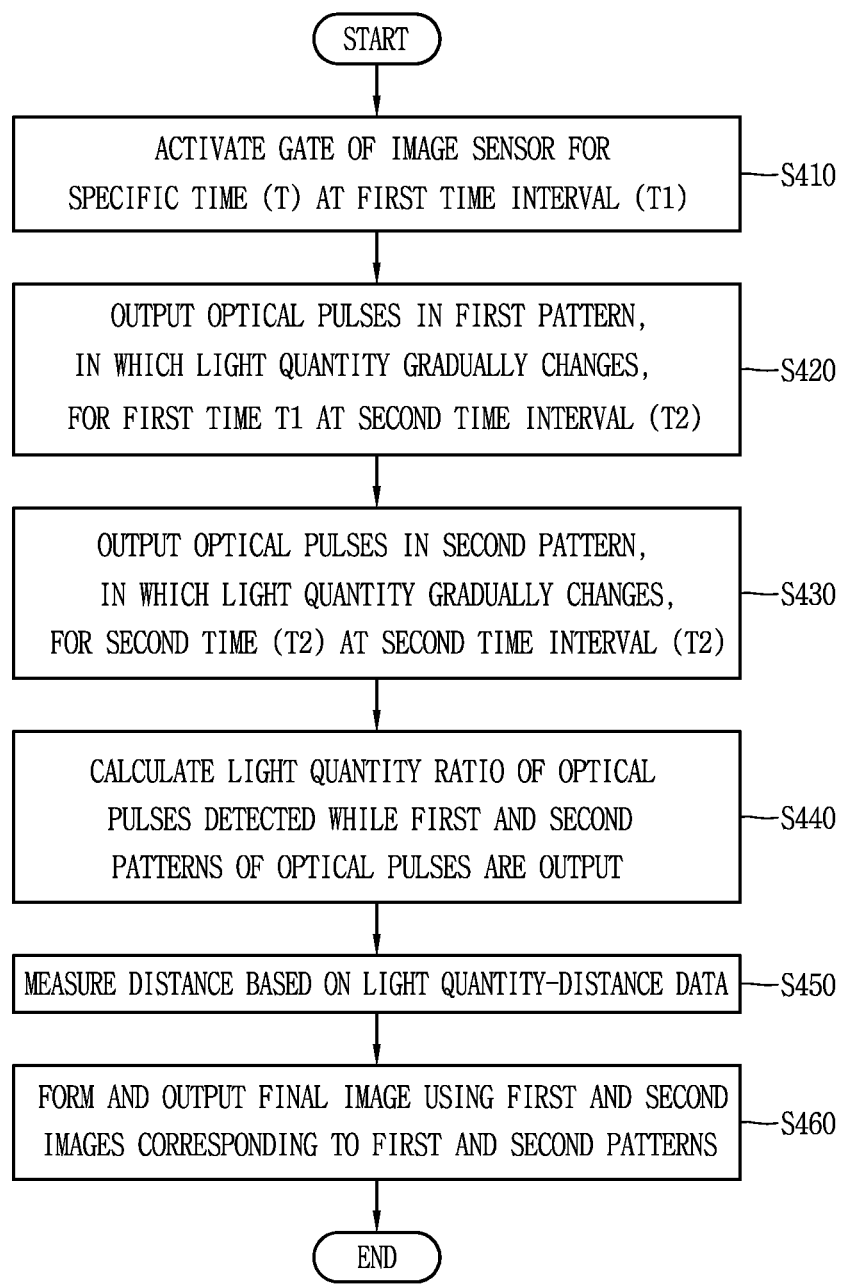

LIGHTING PATTERN 1

(a)

OPTICAL PULSE OUTPUT UNIT

LIGHTING PATTERN 2

(b)

OPTICAL PULSE OUTPUT UNIT (a)

(b)

(c)

OBSTACLE DETECTED

NIGHT IMAGE DISPLAY APPARATUS AND IMAGE PROCESSING METHOD THEREOF

CROSS-REFERENCE TO RELATED APPLICATIONS

This application is the National Stage filing under 35 U.S.C. 371 of International Application No. PCT/KR2016/001346, filed on Feb. 5, 2016, which claims the benefit of earlier filing date and right of priority to Korean Application No. 10-2015-0186740, filed on Dec. 24, 2015, the contents of which are all hereby incorporated by reference herein in their entirety.

TECHNICAL FIELD

The present invention relates to a night image display apparatus for a vehicle, with improved visibility of a far-distance object.

BACKGROUND ART

A night vision device for a vehicle is a device for assisting a driver during night driving or in bad weather such as snowing/raining. The night vision device also serves to transfer a situation or condition within a specific distance to the driver through visual data.

However, the night vision device provided with general sensors and lightings or lamps has a limitation in outputting all the objects at uniform brightness, irrespective of a distance from the vehicle, as a quantity of light reflected from an area far from the vehicle is drastically reduced.

DISCLOSURE OF THE INVENTION

An aspect of the present invention is to provide a night image display apparatus for calculating information related to a distance while improving sharpness of a distant object, and a night image processing method thereof.

To achieve the aspect and other advantages of the present invention, a night image display apparatus according to one embodiment of the present invention may include an optical pulse output unit to output optical pulses, a photographing unit provided with an image sensor forming a plurality of images using optical pulses reflected by an external object, a display unit to output a final image obtained by synthesizing the plurality of images, and a control unit to calculate distance information related to the object displayed in each pixel by using data associated with light quantity ratios of the plurality of images for each pixel of the final image and a light quantity ratio for a distance.

In one embodiment of the present invention, the controller may control the optical pulse output unit to output the optical pulses for a specific time at a first time interval, form a first gate image by activating a first gate for a first time at a second time interval during a pause period during which no optical pulses are output, and form a second gate image by activating a second gate for a second time at the second time interval during the pause period when the first gate is deactivated. The second time may be set to be shorter than the first time, so as to acquire a plurality of images of a far-distance area, thereby providing a clearer image.

In one embodiment of the present invention, the controller may calculate a light quantity ratio for each pixel using a first image formed of optical pulses of a first pattern and a second image formed of optical pulses of a second pattern, and calculate a distance of an image output in each pixel using data associated with a distance-related light quantity ratio, thereby acquiring distance information related to the image displayed in each pixel using the plurality of images.

In one embodiment of the present invention, the apparatus may further include a radar unit to detect an object by outputting electromagnetic waves. The controller may activate the display unit when the object is detected by the radar unit. Accordingly, when a danger is detected by the radar unit, an image related to this can be output and provided to the user.

Effects of the Invention

According to the present invention, even if an object is relatively far away, a clear final image can be output and even distance information can be output together with the final image. This may allow the user to recognize not only an existence of the object but also more accurate position and distance of the object.

Further, when a danger is detected in driving of a vehicle, an image of an obstacle can be displayed on a display unit, so that the driver can immediately recognize the danger of the obstacle. Therefore, the driver can immediately take a measure to avoid the danger.

BRIEF DESCRIPTION OF THE DRAWINGS

FIG. 4A is a flowchart illustrating an image processing method of a night image display apparatus according to another embodiment of the present invention.

BEST MODE OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
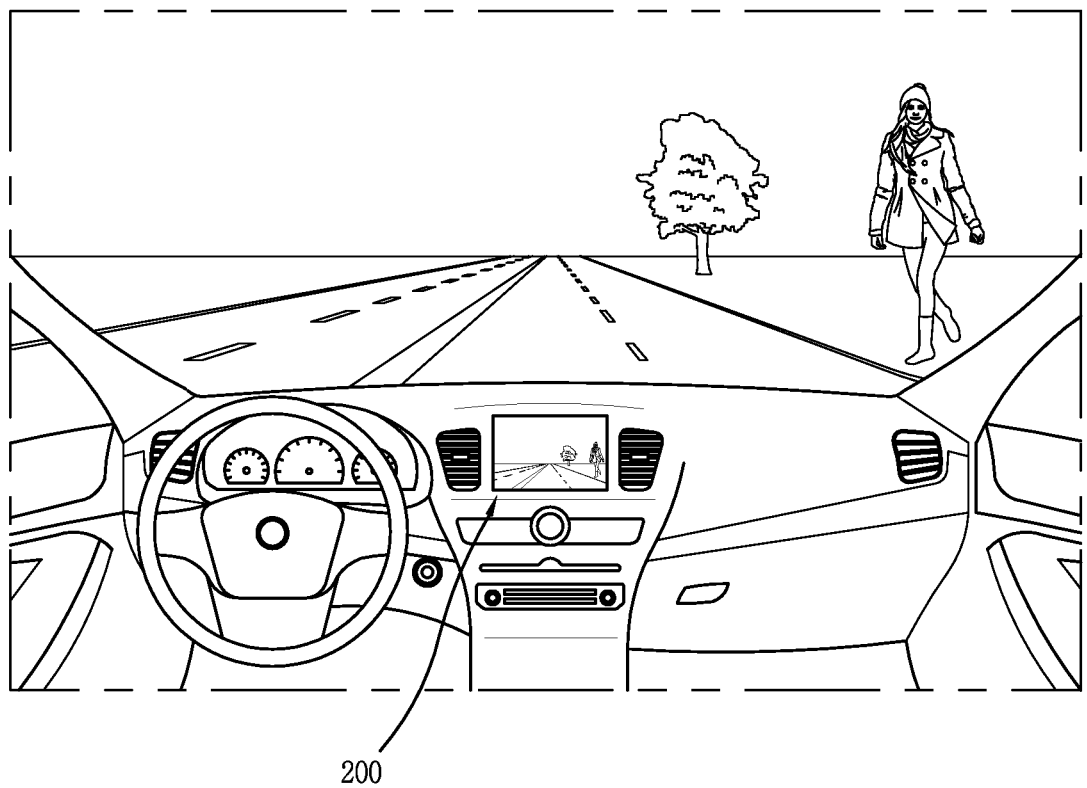
FIG. 1A is a conceptual view illustrating one area of a vehicle provided with a night image display apparatus according to one embodiment of the present invention.
Figure 1B:
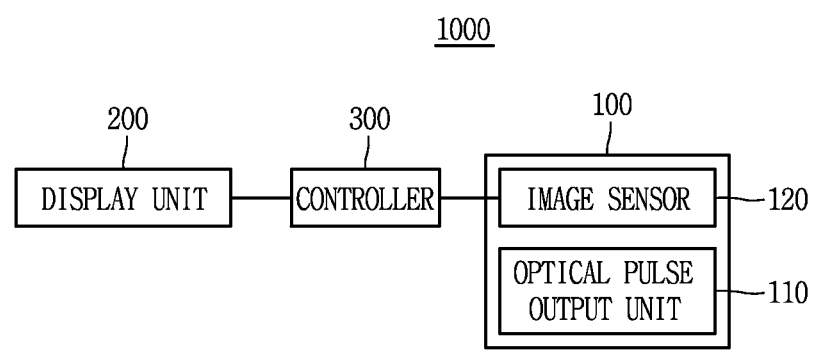
FIG. 1B is a block diagram illustrating components of a night image display apparatus according to one embodiment of the present invention.

FIG. 1A is a conceptual view illustrating one area of a vehicle provided with a night image display apparatus according to one embodiment of the present invention, and FIG. 1B is a block diagram illustrating components of a night image display apparatus according to one embodiment of the present invention. A display unit 200 of a night image display apparatus according to one embodiment of the present invention is preferably arranged so that a driver of a vehicle can see an image thereon while viewing the front.

Referring to FIG. 1B, the night image display apparatus includes a photographing unit (or capturing unit) 100 for photographing (or capturing) an image, a display unit 200 for outputting an image, and a control unit (or controller) 300. The photographing unit 100 includes an optical pulse output unit 110 and an image sensor 120. When an optical pulse is generated by the optical pulse output unit 110, the optical pulse is reflected on an object disposed in front of the vehicle so as to reach the image sensor 120. The image sensor 120 forms an image for detecting a distance from the object using the reflected incident optical pulse.

Figure 2A:
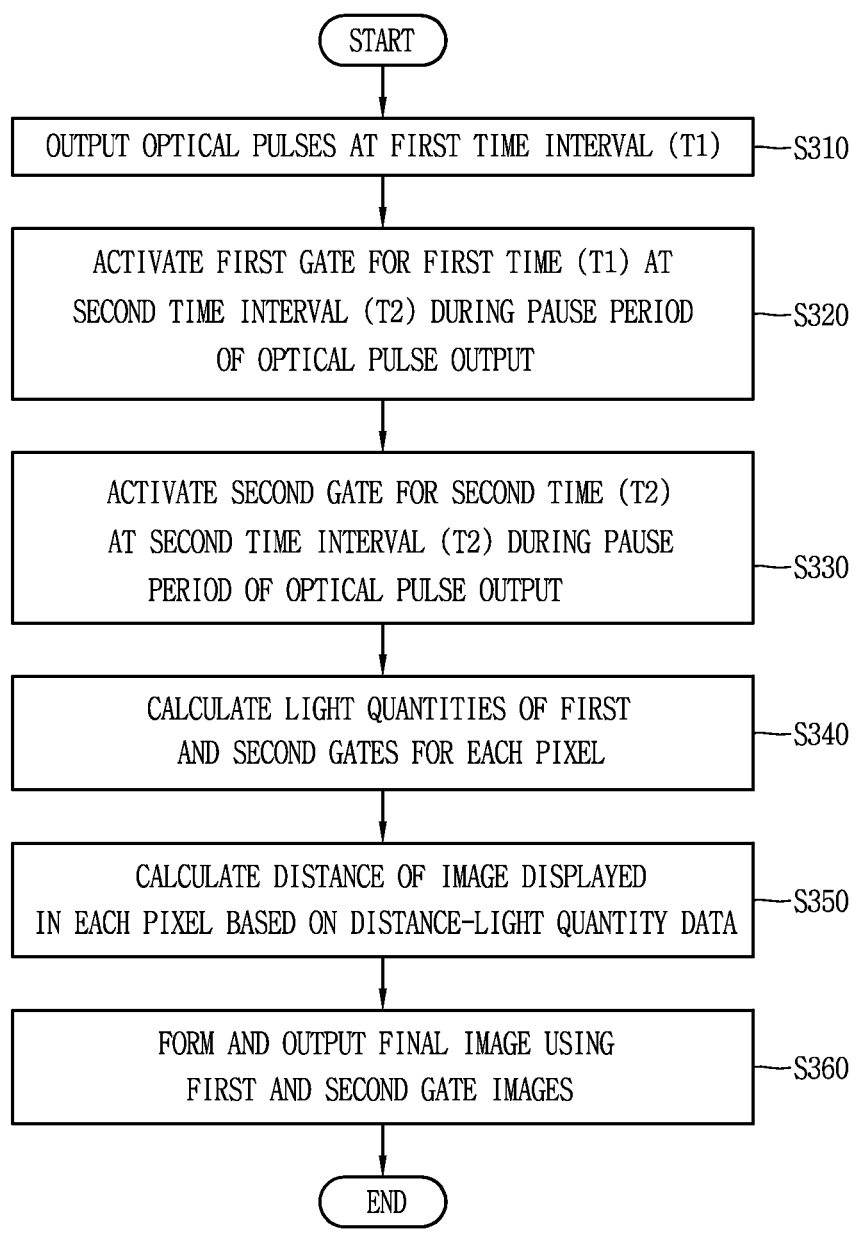
FIG. 2A is a flowchart illustrating an image processing method of a night image display apparatus according to one embodiment of the present invention.
Figure 2B:
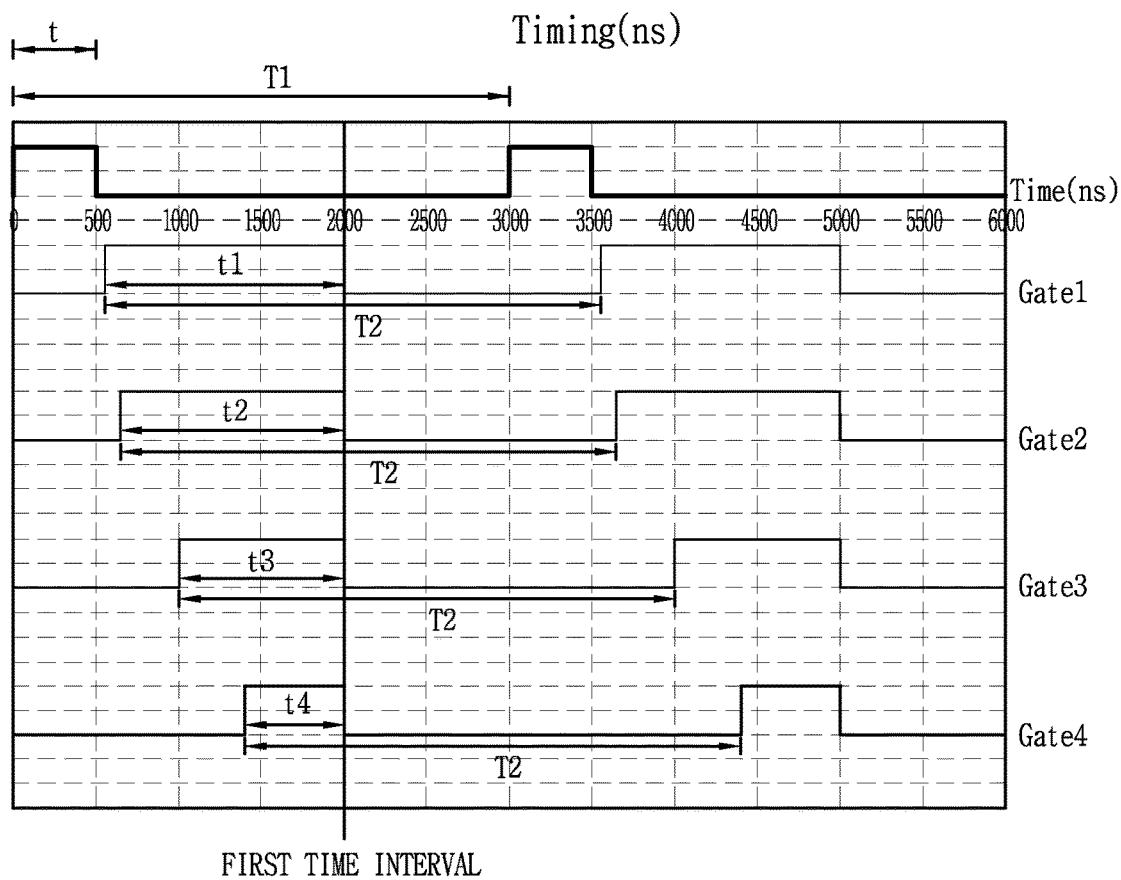
FIG. 2B is a conceptual view illustrating an operation of a plurality of gates in response to an output of an optical pulse.

FIG. 2A is a flowchart illustrating an image processing method of a night image display apparatus according to one embodiment of the present invention, and FIG. 2B is a conceptual view illustrating an operation of a plurality of gates in response to an output of an optical pulse.

Referring to FIG. 2A, the optical pulse output unit 110 outputs optical pulses at a first time interval T1 (S210). The optical pulse output unit 110 outputs the optical pulses for a specific time t (S310). For example, the specific time may correspond to about 500 ns, but is not limited thereto.

During a pause period during which no optical pulses are output, a first gate of the image sensor 120 is activated for a first time t1 at a second time interval T2 (S320). Accordingly, a first gate image having a plurality of pixels is acquired through optical pulses reflected by an object. Referring to FIG. 2B, the first gate is activated for the first time t1 from a time point when the output of the optical pulse is restricted. However, the present invention is not limited thereto, and the controller 300 controls the image sensor 100 so that the first gate is activated after a predetermined time after the output of the optical pulse is restricted. The first gate is activated a first preset number of times N1 while the optical pulses are output.

After the first gate is activated the first preset number of times (N1), a second gate is activated. The second gate is activated for a second time t2 at a second time interval T2 during the pause period during which no optical pulses are output (S330). The second time t2 is shorter than the first time t2. The second gate is activated later by a time difference (delay time) between the first time t1 and the second time t2 after the output of the optical pulse is restricted, and periods of time from the time point when the output of the optical pulse is restricted to time points when the first and second gates are switched to an inactive state are the same as each other. That is, the first and second gates may detect optical pulses reflected by an object of the same maximum distance and the second gate cannot detect optical pulses reflected by an object located at a close distance during the delay time. Thus, an image of a far-distance area can be obtained by the second gate. For example, when the first gate forms an image for an environment between about 30 m and about 300 m, the second gate forms an image for an environment between about 75 m and about 300 m.

The second gate is activated at a second time interval T2 by a second number of times N2, and the first number of times N1 and the second number of times N2 may be the same as each other. However, since the degree of reflection and arrival of the optical pulses are lowered in the far-distance image, the second number of times N2 may be set to be greater than the first number of times N1 according to an output state of the optical pulses and a reflected state depending on an external environment.

Referring to FIG. 2B, after the second gate is activated the second number of times N2, the third and fourth gates are activated by a third number of times N3 and a fourth number of times N4, respectively. Time intervals in which the third and fourth gates are activated are the same as the second time interval T2. However, the third gate is activated for a third time t3, and the fourth gate is activated for a fourth time t4. The fourth time t4 is the shortest and it becomes longer in the order of the third time t3, the second time t2 and the first time t1. Relative time points at which the first to fourth gates are switched from the active state to the inactive state are the same based on the time point when the output of the optical pulse is restricted.

However, the first gate is activated first and the fourth gate is activated last based on the time point when the output of the optical pulse is restricted. The fourth gate additionally forms only an image of a far-distance area (for example, about 150 m to about 300 m) from the optical pulse output unit 110. That is, by the second to fourth gates, the night image display apparatus obtains an image plural times as the image corresponds to a far-distance image.

A light quantity ratio obtained by each of the plurality of gates is calculated for each pixel (S340). The controller 300 divides the detected quantity of light of each gate by a number of times of activating each gate. The light quantity ratio of each of the first to fourth gates for each pixel is calculated. For example, the light quantity ratio of the second gate with respect to the first gate, the light quantity ratio of the third gate with respect to the second gate, and the light quantity ratio of the fourth gate with respect to the third gate are calculated for each pixel.

Figure 2C:
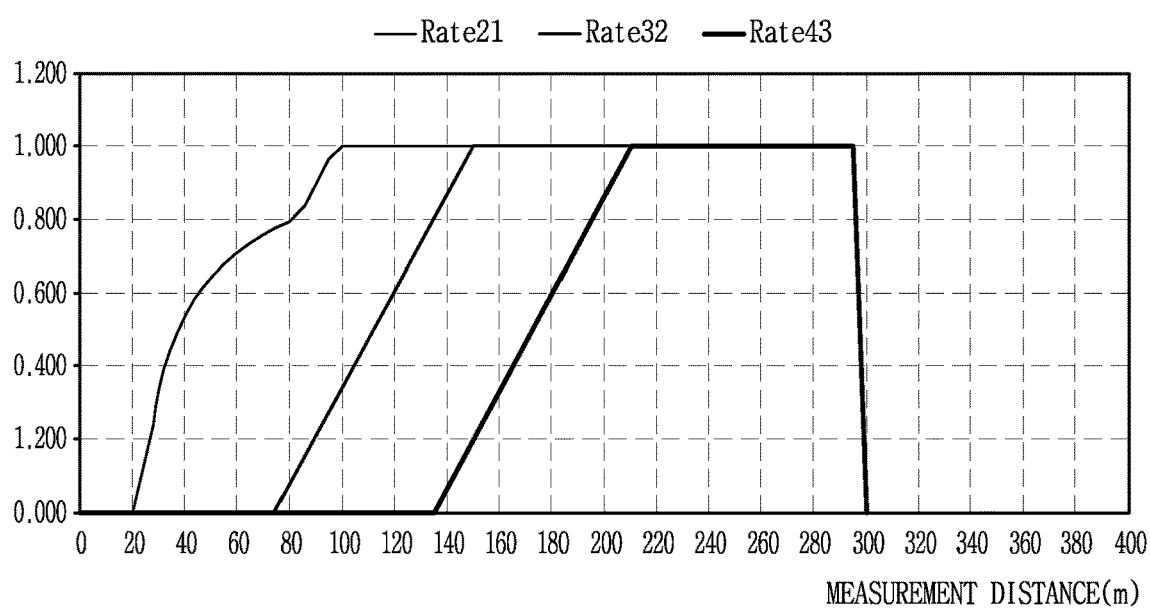
FIG. 2C is a graph showing data associated with a light quantity ratio according to a distance when an output time of an optical pulse is constant.

As illustrated in FIG. 2C, the memory of the night image display apparatus 1000 may store data related to a light quantity ratio according to a distance. Alternatively, when such images are formed by the plurality of gates (i.e., when the plurality of gate images are formed), the controller may receive the data related to the light quantity ratio according to the distance from the outside. The controller 300 calculates a distance of an image of each pixel using the data and the light quantity ratio (S350).

For example, when the light quantity ratios of the first and second gates correspond to 0.6 for one pixel, an object corresponding to an image of the pixel is calculated to be about 42 m away from the night image display apparatus 1000. Distance information on an image of an object located between about 20 m and about 75 m may be obtained by using the light quantity ratios of the first and second gates. However, the present invention is not limited to this, and the activation time points of the first to fourth gates may be adjusted to acquire images and distance information related to objects which are located closer, or images and distance information related to objects located farther. The calculation of the light quantity ratio of each gate may be performed by the image sensor 120 or may be processed by a circuit end forming an image in the image sensor.

The controller 300 synthesizes the plurality of gate images to form a final image and controls the display unit 200 to output the final image (S360). Accordingly, since the image of the object located at a far distance is obtained a plural number of times by the first to fourth gates, the image of the object located at the far distance can be formed brighter even in the final image.

In addition, the distance calculation can be performed using the images obtained by the plurality of gates, and thus the distance information related to the object can be provided together with the images even without a separate detection sensor for detecting the distance.

Figure 3:
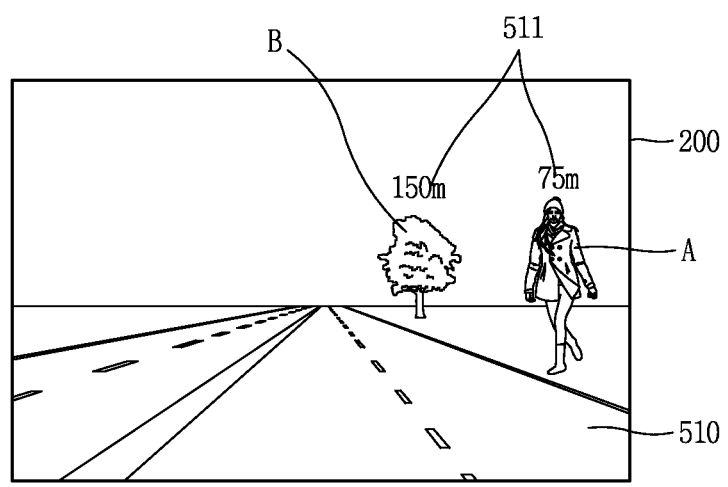
FIG. 3 is a conceptual view illustrating a method of displaying a final image according to one embodiment of the present invention.

FIG. 3 is a conceptual view illustrating a method of displaying a final image according to one embodiment of the present invention. The display unit 200 outputs a final image 510 formed by the plurality of gate images. Since the image for the far-distance object is acquired more than an image for a short-distance object, the final image is formed with uniform brightness regardless of the distance. For example, if A is a short-distance object and B is a far-distance object, A and B are formed with substantially similar brightness.

The controller 300 may control the display unit 200 to output distance information 511 related to each object along with a final image 510. For example, the distance information 511 may be output in form of text adjacent to each object. The controller 300 calculates a light quantity ratio for a pixel from which the image of the object is acquired, and acquires distance information related to the image displayed on the pixel according to the data and the light quantity ratio.

That is, since the final image is output as a clear image even when the object is located at a relatively far distance and the distance information is also output together with the final image, the user can more accurately recognize not only the existence of the object but also the position and distance of the object.

Figure 4B:
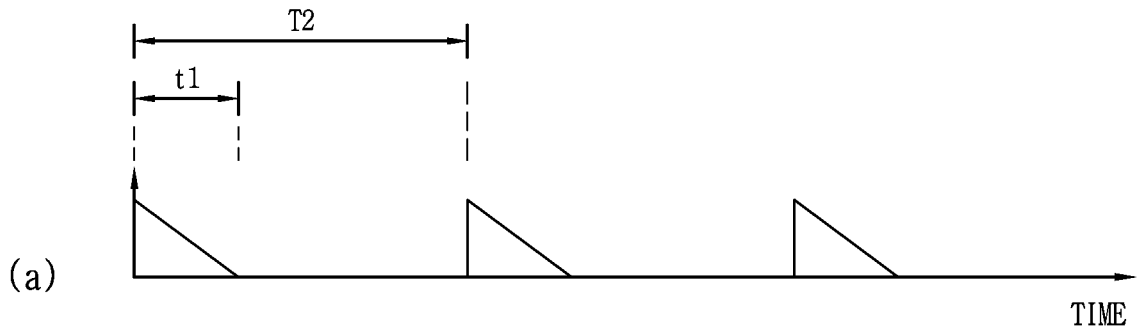
FIG. 4B is a conceptual view illustrating an output state of an optical pulse corresponding to an active state of a gate.
Figure 4B:
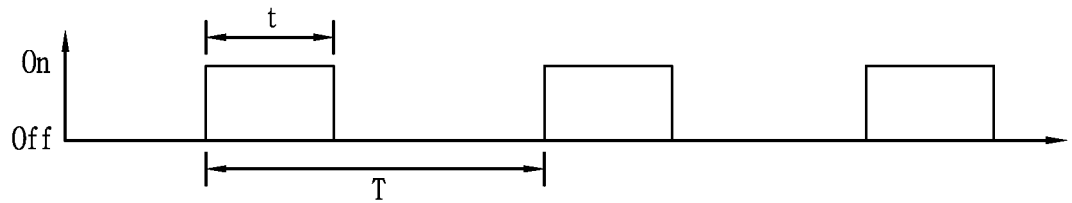
Figure 4B:
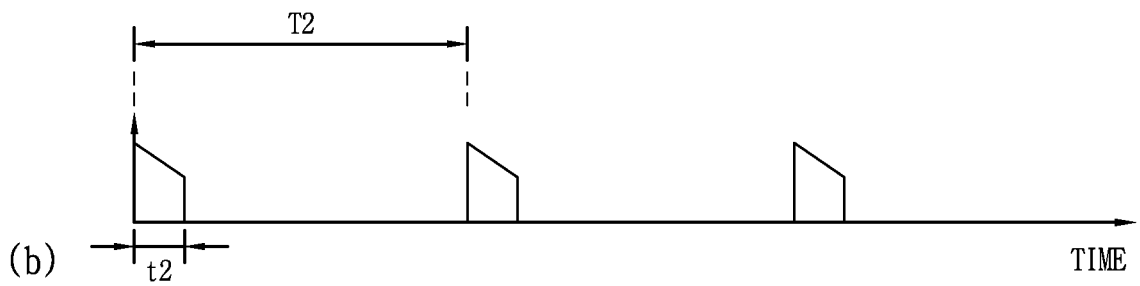
Figure 4B:
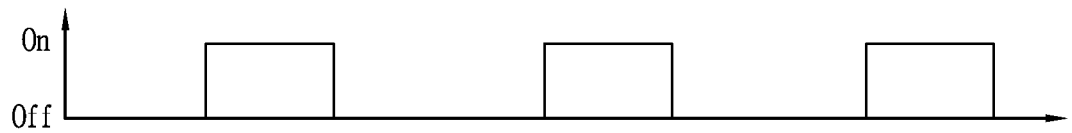

FIG. 4A is a flowchart illustrating an image processing method of a night image display apparatus according to another embodiment of the present invention, and FIG. 4B is a conceptual view illustrating an output state of an optical pulse corresponding to an active state of a gate.

A gate of the image sensor 210 is activated for a specific time t at a first time interval T1. (S410). The controller 300 controls an optical pulse output unit 220 to output optical pulses for the first time t1 at the second time interval T2 in a manner of outputting the output optical pulses in a first pattern in which a light quantity gradually changes for the first time t1 (S420). Referring to (a) of FIG. 4B, the optical pulses are output in a state where the gate is inactivated, and the optical pulses output in the first pattern are reduced gradually until the output of the optical pulses is restricted. Accordingly, when the light quantity of the optical pulses is gradually reduced and the output of the optical pulses is restricted, the controller 300 controls the optical pulse output unit 110 and the image sensor 120 in a manner that the gate is activated.

When the optical pulses are output in the first pattern a first number of times N1, the controller 300 outputs optical pulses in a second pattern, different from the first pattern, for a second time t2 at the second time interval T2 (S430). The second time t2 is set to be shorter than the first time t1. A time from a time point when the output of the optical pulses of the second pattern is restricted to a time point when the gate is activated is longer than a time from a time point when the output of the optical pulses of the first pattern is restricted to a time point when the gate is activated. Accordingly, optical pulses reflected by an object which is located at a relatively close distance are not detected when the optical pulses of the second pattern are output. The controller 300 controls the optical pulse output unit 110 to output the optical pulses by a second number of times N2, and the first number of times N1 and the second number of times N2 may be set to be the same as each other. Although not illustrated, the controller 300 may acquire an additional image by controlling the optical pulse output unit 220 to output the optical pulses in a third pattern, which is the same as the second pattern but is output for a third time t3 shorter than the second time t2.

As illustrated in FIG. 4B, the first pattern and the second pattern may be set to be the same in a ratio at which the light quantity is decreased but different only in an output time. The controller 300 calculates a light quantity ratio of the optical pulses detected by the gate while the first and second patterns are output (S440). In this case, the controller 300 divides the light quantity by the number of times of outputting the optical pulses and calculates a light quantity ratio for each pixel.

Figure 4C:
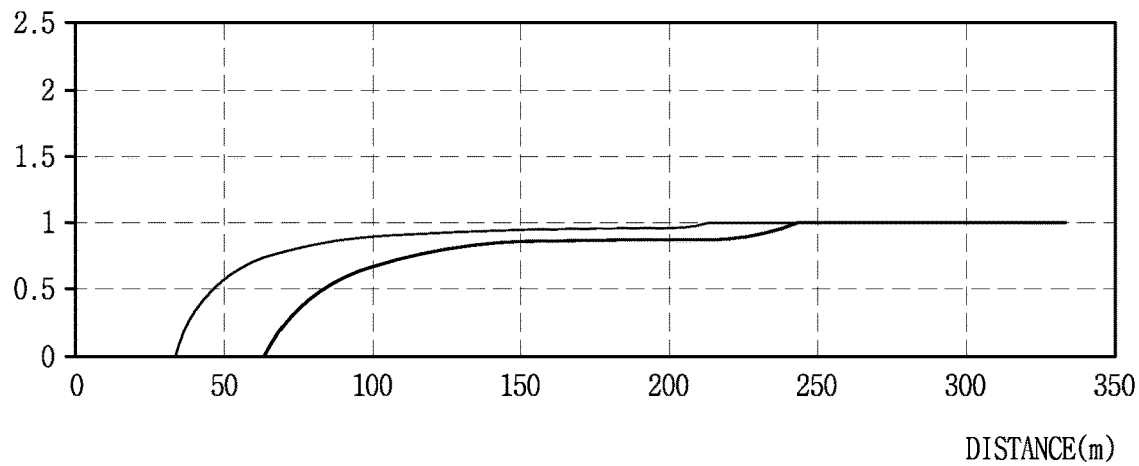
FIG. 4C is a graph showing data associated with a light quantity ratio according to a distance when an activation time of an image sensor is constant.

The controller 300 measures a distance using data related to the light quantity ratio and the distance and the calculated light quantity ratio (S450). The data related to the light quantity ratio and distance are as illustrated in FIG. 4C.

When the light quantity ratio is about 0.6, the distance of the object displayed on the corresponding pixel corresponds to about 50 m.

Figure 4D:
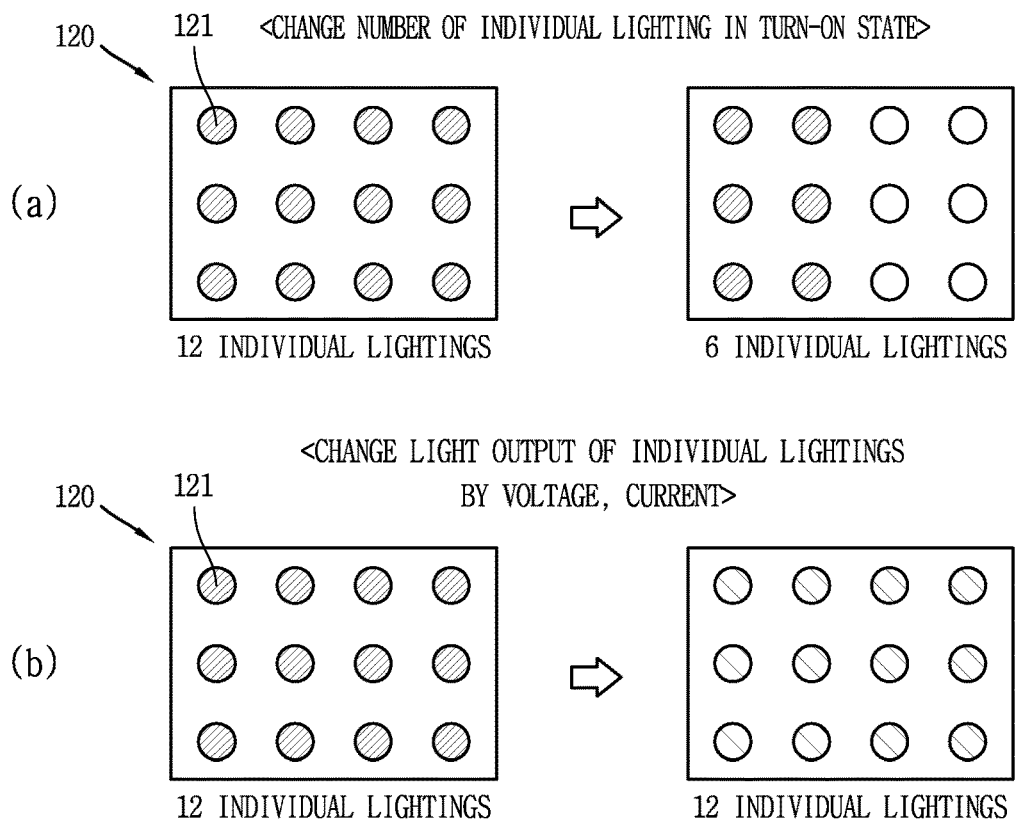
FIG. 4D is a conceptual view illustrating a control method of adjusting a quantity of light, namely, a control method of an optical pulse output unit.

FIG. 4D is a conceptual view illustrating a control method of adjusting a quantity of light, namely, a control method of an optical pulse output unit. Referring to (a) of FIG. 4D, the optical pulse output unit 220 may include a plurality of lightings 121. The controller 300 may gradually turn off some of the plurality of lightings 121 according to a lapse of time so as to reduce the light quantity.

Meanwhile, referring to (b) of FIG. 4D, the optical pulse output unit 220 may simultaneously reduce the light quantities of the plurality of lightings. The controller 300 may simultaneously control brightness of all the lightings by changing voltages/currents applied to the plurality of lightings.

However, the number and arrangement of lightings are not limited to those illustrated in the drawings.

Figure 5A:
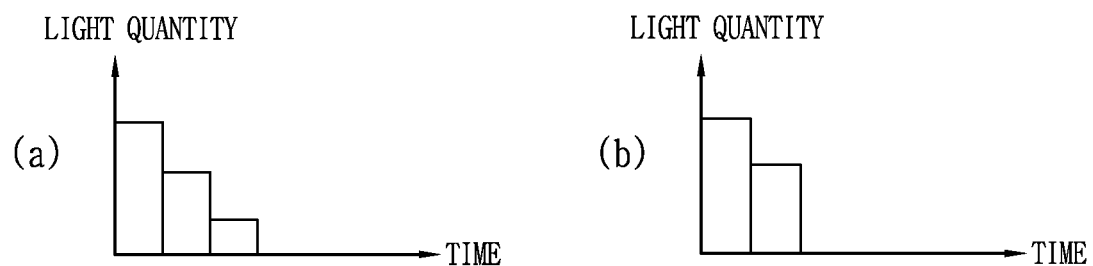
FIGS. 5A and 5B are conceptual views illustrating a pattern in which a quantity of light changes.
Figure 5B:
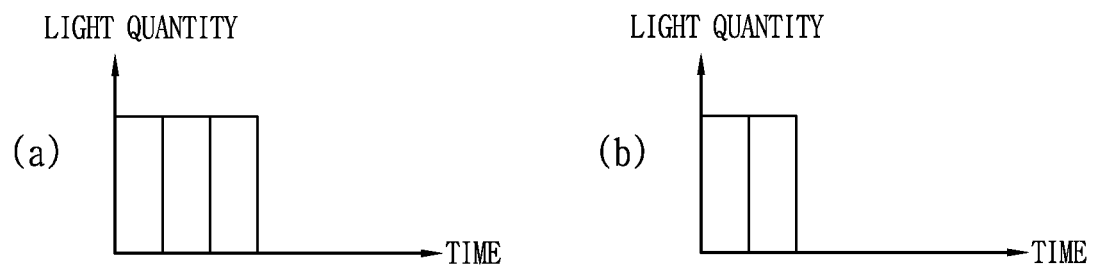

FIGS. 5A and 5B are conceptual views illustrating a pattern in which a quantity of light changes.

Referring to (a) of FIG. 5A, the controller 300 discretely or discontinuously reduces the amount of light. For example, in the case of performing control by use of a light quantity of three steps, the controller 300 forms the first pattern such that the optical pulses are output with the light quantity of three steps and the second pattern such that the optical pulses are output with the light quantity up to two steps. When those patterns are completely formed, the controller 180 may control the optical pulse output unit 120 to block the output of the optical pulses.

On the other hand, referring to FIG. 5B, the controller 300 forms first and second patterns by adjusting a time for which the optical pulses are output with the same light quantity.

The controller 300 may set a pattern of outputting the optical pulses based on a distance up to an area to be photographed and an external environment.

Figure 6:
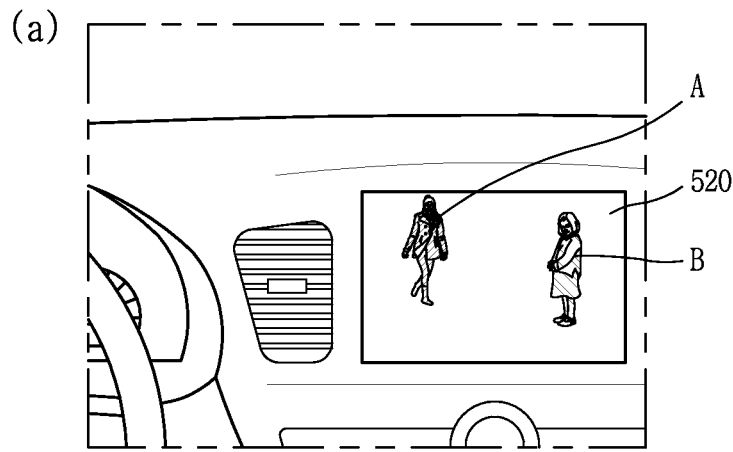
FIG. 6 is a conceptual view illustrating a method of outputting a final image and distance information.
Figure 6:
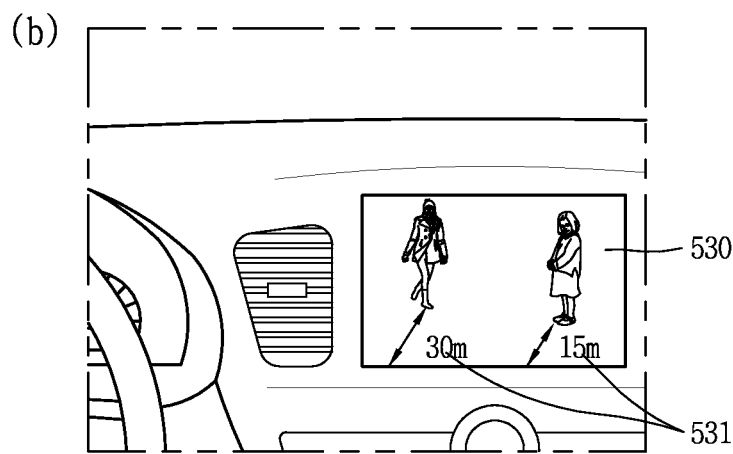
Figure 6:
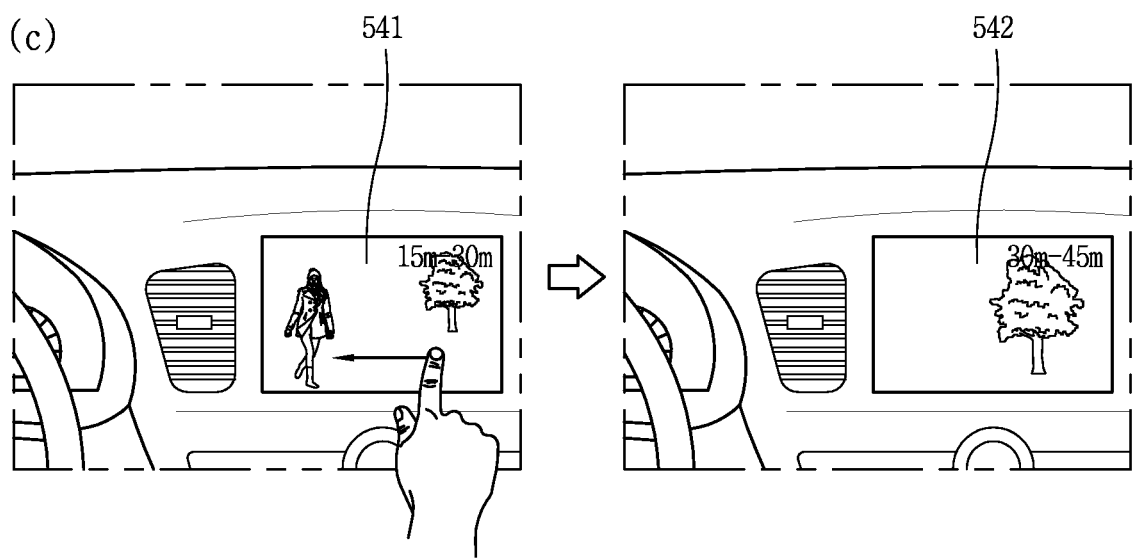

FIG. 6 is a conceptual view illustrating a method of outputting a final image and distance information. Referring to (a) of FIG. 6, the display unit 200 outputs a final image 520 including first and second objects A and B. The controller 300 calculates distances up to the first and second objects A and B, respectively. The display unit 200 outputs images corresponding to the first and second objects A and B in different colors using the distance information related to the first and second objects A and B.

Referring to (b) of FIG. 6, a final image 530 may output distance information 531 related to each object in form of text. Alternatively, the controller 300 may form a graphic image to correspond to the distance information 531. For example, in case of a bar-shaped graphic image, the graphic image which is long as the distance increases may be output.

Referring to (c) of FIG. 6, a final image 541 may output only an image corresponding to a partial distance. The controller 300 may change a range of the partial distance when a specific control command is applied by the user.

The controller 300 adjusts a time at which each gate is activated in the embodiment of FIG. 2A or change an output pattern of the optical pulses in the embodiment of FIG. 4A, on the basis of the specific control command. Accordingly, the user can selectively receive only an image corresponding to a desired distance range.

Figure 7:
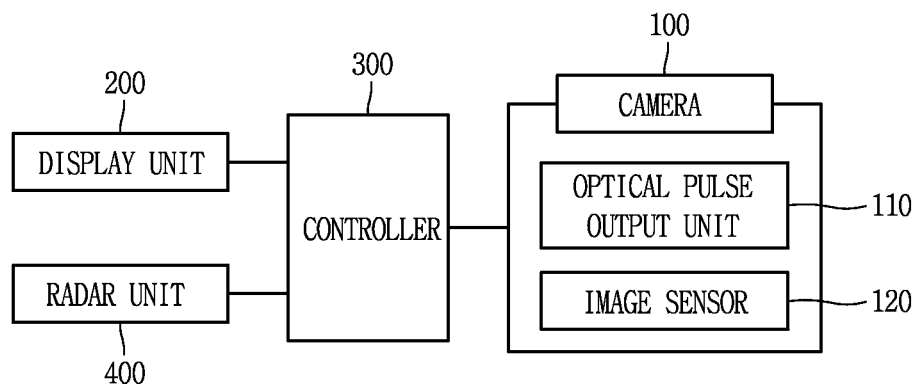
FIG. 7 is a block diagram illustrating components of a night image display apparatus according to another embodiment of the present invention.

FIG. 7 is a block diagram illustrating components of a night image display apparatus 1000 according to another embodiment of the present invention. The night image display apparatus 1000 according to this embodiment includes substantially the same components as those illustrated in FIG. 1B except for a radar unit, and thus the same reference numerals are assigned to the same components, and redundant explanation is omitted.

A radar unit 400 outputs electromagnetic waves to detect an obstacle (or a target) while the vehicle is traveling, thereby providing information related to a distance up to the obstacle, a speed moving toward (or away from) the obstacle, an angle between the traveling direction and an area where the obstacle is located, and the like. The night image display apparatus 1000 according to this embodiment may be controlled using the information provided by the radar unit 400.

However, the radar unit may not be included in the night image display apparatus 1000. When the radar unit and the night image display apparatus 1000 are installed in a vehicle together, an object detected by the radar unit and information related to the object may be provided to the night image display apparatus 1000 through wired/wireless communication.

Figure 8:
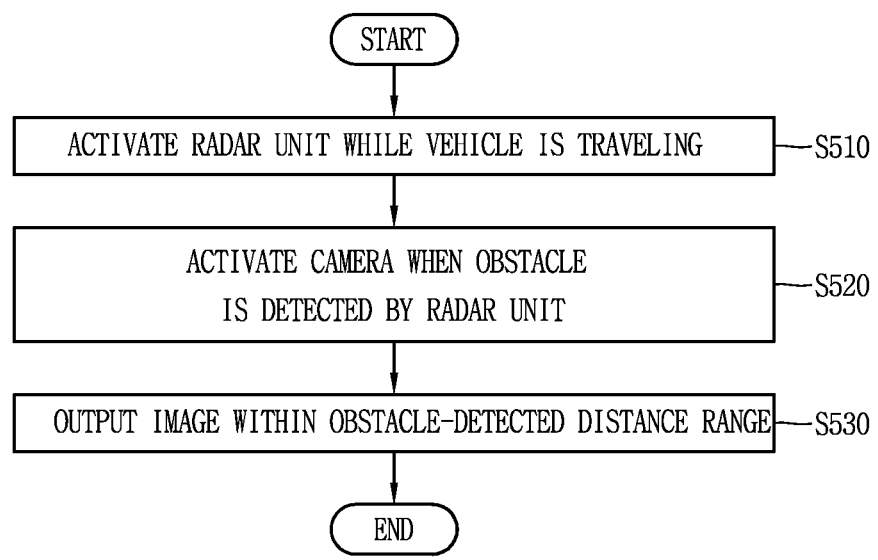
FIG. 8 is a flowchart illustrating a control method of a night image display apparatus according to an embodiment of the present invention.
Figure 9A:
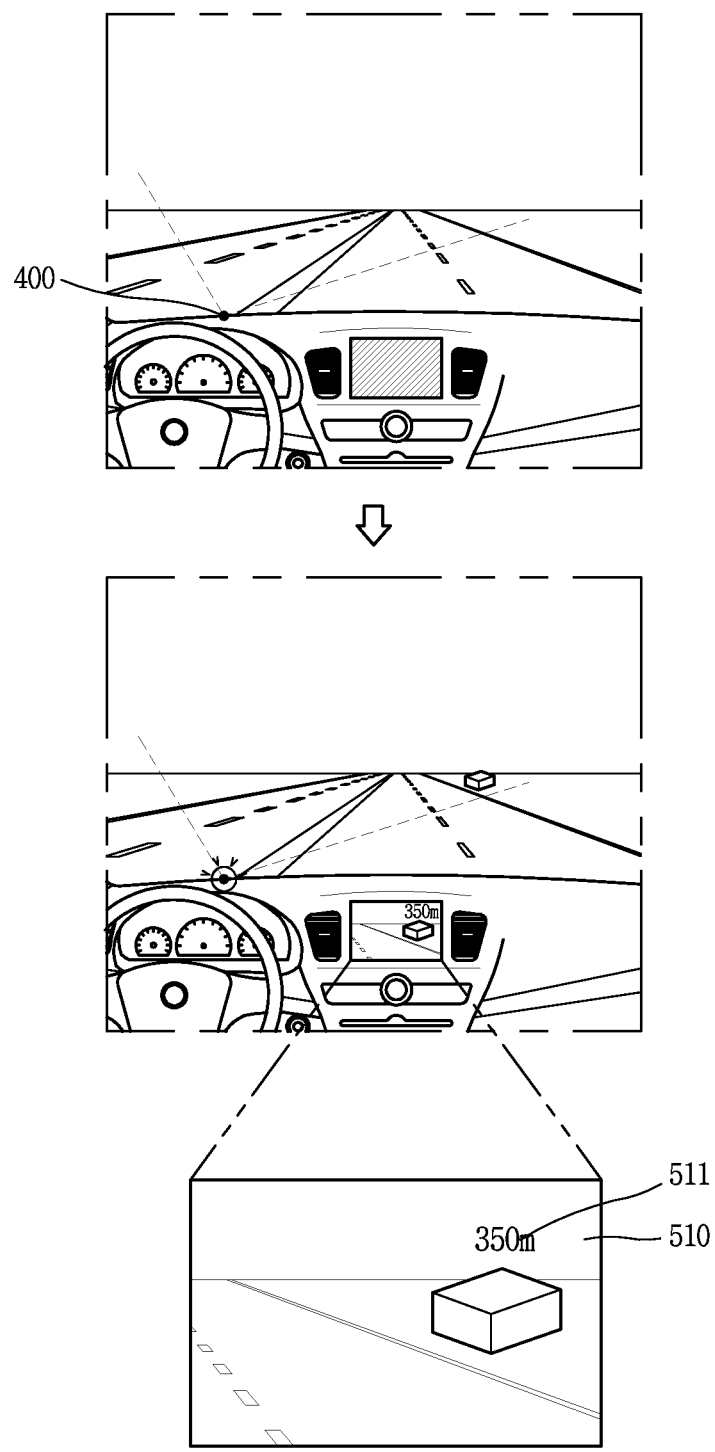
FIGS. 9A and 9B are conceptual views illustrating the control method of the night image display apparatus of FIG. 8.
Figure 9B:
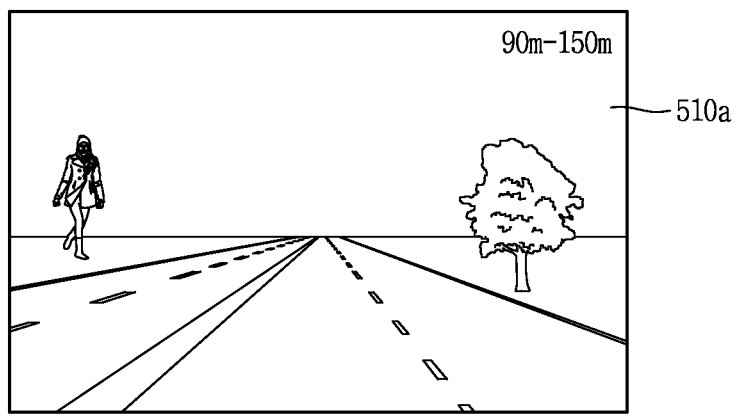
Figure 9B:
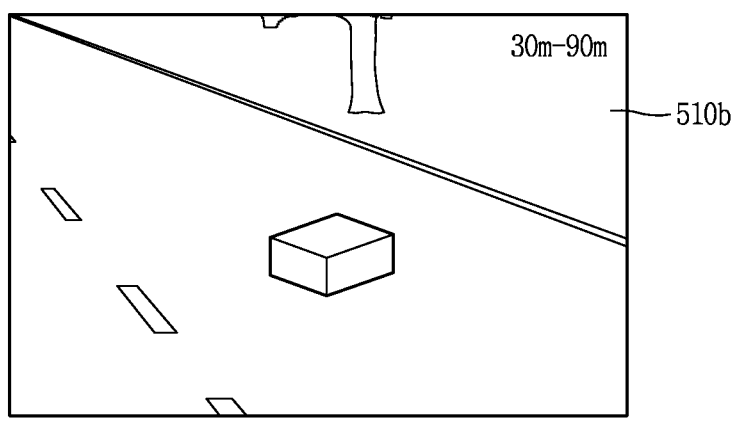

FIG. 8 is a flowchart illustrating a control method of the night image display apparatus 1000 according to an embodiment of the present invention, and FIGS. 9A and 9B are conceptual views illustrating the control method of the night image display apparatus 1000 of FIG. 8.

The controller 300 activates the radar unit 400 while the vehicle is traveling (S510). The radar unit 400 is preferably disposed adjacent to the photographing unit 100, or arranged to have the same detection range and photographing range as those of the photographing unit 100.

The controller 300 activates the photographing unit 100 when an obstacle (or a target) is detected by the radar unit 400. That is, the controller 300 outputs optical pulses by the optical pulse output unit 110 and activates the image sensor 120.

In addition, the controller 300 may set a distance range for acquiring image information by using the information related to the obstacle received from the radar unit 400. The controller 300 outputs an image of the distance range in which the obstacle is detected using the distance information (S530). The controller 300 may control the display unit 200 to be deactivated again when the obstacle is not detected by the radar unit after a final image including the image of the obstacle is output.

The controller 300 may control both the photographing unit 100 and the display unit 200 or switch only the display unit from the inactive state into the active state, based on whether or not an obstacle is detected by the radar unit 400.

Referring to FIG. 9B, when an obstacle is detected by the radar unit 400 in a state where a first image 510a of a specific distance range is being output, the controller 300 controls the display unit 200 to output a second image 510b of a different distance range. The controller 300 controls the optical pulse output unit 110 and the image sensor 120 by using the information related to the obstacle obtained by the radar unit 400.

According to this embodiment, when a danger is detected in the driving of the vehicle, the image of the obstacle is output on the display unit 200, and thus the driver can immediately recognize the danger of the obstacle. Therefore, the driver can immediately take a measure to avoid the danger.

The foregoing detailed description should not be limitedly interpreted in all the aspects and should be understood to be illustrative. The scope of the present invention should be decided by reasonable interpretation and all changes and modifications that fall within an equivalent range are therefore intended to be embraced by the appended claims.

INDUSTRIAL APPLICABILITY

The present invention provides an image processing method that provides an image of a relatively far-distance area more clearly, and thus can be utilized in various related industrial fields.

What is claimed is:

1. An electronic device for displaying a night image, the electronic device comprising:
    a display;
    a photographing unit including first gated image sensors and second gated image sensors;
    an optical pulse output unit configured to output optical pulses to one or more external objects at a first time interval for a specific time; and
    a controller configured to:
        activate the first gated image sensors for a first time at a second time interval and acquire a first gate image by using optical pluses reflected from the one or more external objects;
        activate the second gated sensors for a second time at the second time interval and acquire a second gate image by using the optical pluses reflected from the one or more external objects, wherein the second time is shorter than the first time;
        identify a light quantity ratio for each pixel of the first gate image and the second gate image;
        identify distance information including distances between the one or more external objects and the electronic device based on the light quantity ratio and a distance-specific light quantity ratio pre-stored in a memory of the electronic device;
        generate a final image based on the distance information using the first gate image and the second gate image such that each of the one or more external objects included in the final image has similar brightness; and
        cause the display to display the final image.

2. The electronic device of claim 1, wherein the controller is further configured to:
    cause the optical pulse output unit to output the optical pulses for the specific time at the first time interval;
    generate the first gate image by activating the first gated image sensors for the first time at the second time interval during a pause period during which no optical pulses are output; and
    generate the second gate image by activating the second gated image sensors for the second time at the second time interval during the pause period when the first gated image sensors are deactivated.

3. The electronic device of claim 2, wherein a time difference between a time point when an output of the optical pulses is restricted and a time point when the first gated image sensors are deactivated is same as a time difference between the time point when the output of the optical pulses is restricted and a time point when the second gated image sensors are deactivated.

4. The electronic device of claim 2, wherein the controller is further configured to:
    activate the first gated image sensors a first number of times and then activate the second gated image sensors a second number of times; and
    calculate the light quantity ratio after dividing the light quantities included in the first gate image and the second gate image by the first and second number of times, respectively.

5. The electronic device of claim 1, wherein the controller is further configured to:
    generate an image by activating the first and second gated image sensors for the specific time at the first time interval;
    cause the optical pulse output unit to output the optical pulses in a first pattern at the second time interval, the first pattern formed such that the light quantity is gradually reduced while the gated image sensors are deactivated; and
    cause the optical pulse output unit to output the optical pulses in a second pattern, different from the first pattern, after outputting the optical pulses of the first pattern by a first number of times.

6. The electronic device of claim 5, wherein the controller is further configured to:
    calculate a light quantity ratio for each pixel by using a first image formed of the optical pulses of the first pattern and a second image formed of the optical pulses of the second pattern; and
    calculate a distance of an image output in each pixel by using data associated with a light quantity ratio with respect to a distance.

7. The electronic device of claim 5, wherein the optical pulse output unit comprises a plurality of lightings, and
    wherein the controller is further configured to gradually turn off some of the plurality of lightings to reduce the light quantity.

8. The electronic device of claim 1, wherein the controller is further configured to cause the display to output the distance information together with the final image.

9. The electronic device of claim 8, wherein the controller is further configured to cause the display to:
    output the one or more external objects included in the final image in different colors based on the distance information; or
    output text indicating the distance information.

10. The electronic device of claim 1, further comprising a radar unit configured to detect an object by outputting electromagnetic waves,
    wherein the controller is further configured to activate the display when the object is detected by the radar unit.

11. The electronic device of claim 10, wherein the controller is further configured to:
    activate the photographing unit when the object is detected by the radar unit; and
    set an activation period and an activation time of the first and second gated image sensors or the optical pulse output unit based on distance information related to the object detected by the radar unit.

12. The electronic device of claim 10, wherein the controller is further configured to set an activation period and an activation time of the first and second gated image sensors or the optical pulse output unit based on the distance information related to the object so as to output an image of the object when the object is detected by the radar unit while the final image is being output on the display.

13. A method for displaying a night image by an electronic device, the method comprising:
    outputting optical pulses to one or more external object at a first time interval for a specific time;

activating first gated image sensors for a first time at a second time interval, and acquiring a first gate image by using optical pulses reflected from the one or more external objects;

activating second gated image sensors for a second time at the second time interval, and acquiring a second gate image by using the optical pulses reflected from the one or more external objects, wherein the second time is shorter than the first time;

identifying a light quantity ratio for each pixel of the first gate image and second gate image;

identifying distance information indicating distances between the one or more external objects and the electronic device based on the light quantity ratio and a distance-specific light quantity ratio pre-stored in a memory of the electronic device; and generating and outputting a final image based on the distance information using the first gate image and the second gate image such that each of the one or more external objects included in the final image has similar brightness.

14. The method of claim 13, further comprising:

generating the first gate image by activating the first gated image sensors for the first time at the second time interval during a pause period during which no optical pulses are not outputted; and generating the second gate image by activating the second gated image sensors for the second time at the second interval during the pause period when the first gated image sensors are deactivated.

15. The method of claim 13, further comprising:

activating a radar unit for detecting an object by outputting electromagnetic waves; and when the object is detected by the radar unit, setting an activation period and an activation time of the first and second gated image sensors based on distance information related to the object detected by the radar unit.

* * * * *